Aug. 1, 1961  J. T. ZELLERS, JR  2,994,519
GLASS MELTING FURNACE AND METHOD OF OPERATION
Filed March 27, 1959  3 Sheets-Sheet 1

INVENTOR.
BY James T. Zellers, Jr.
Nobbe & Swope
ATTORNEYS

Aug. 1, 1961  J. T. ZELLERS, JR  2,994,519
GLASS MELTING FURNACE AND METHOD OF OPERATION
Filed March 27, 1959  3 Sheets-Sheet 2
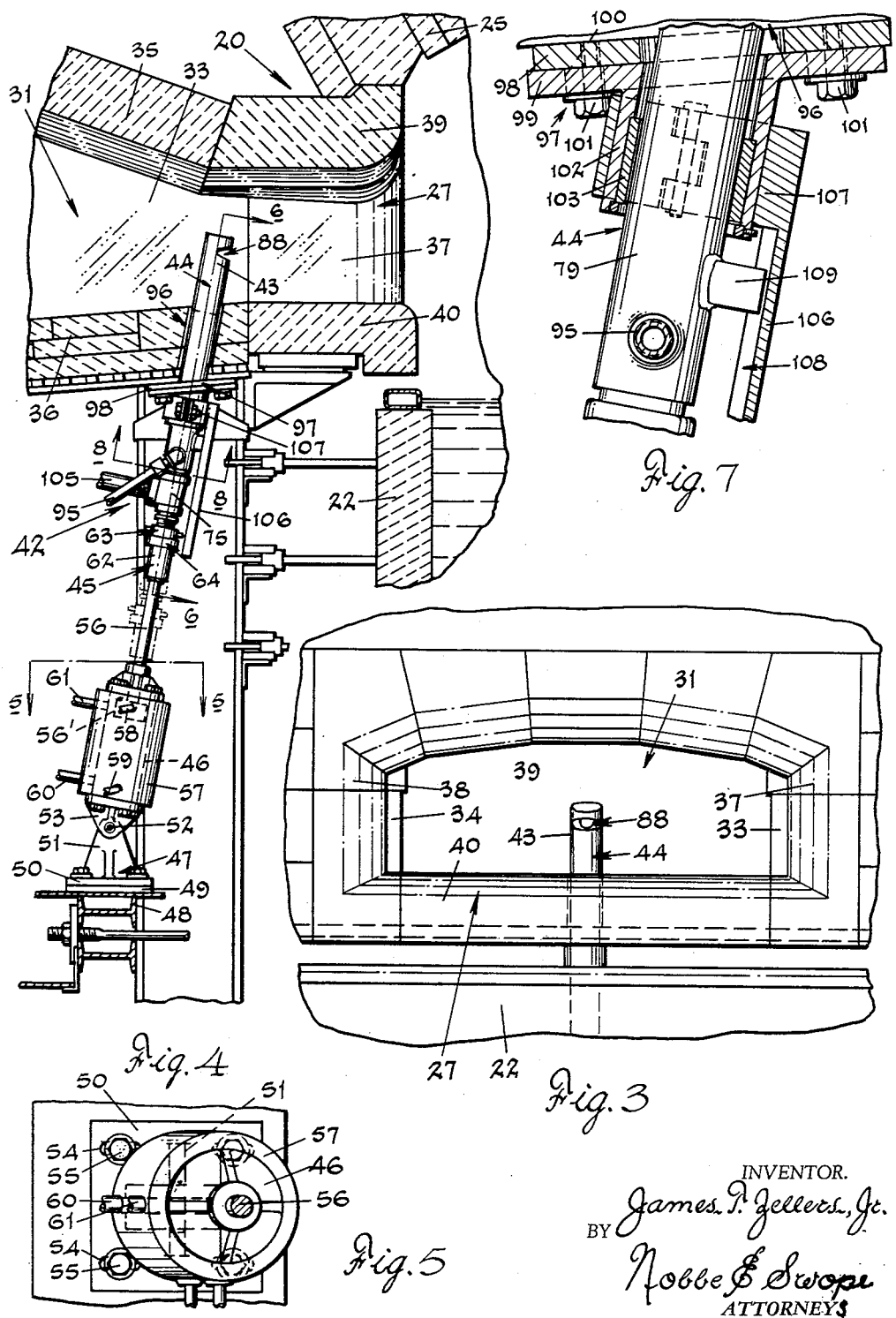
INVENTOR.
James T. Zellers, Jr.
BY
Nobbe & Swope
ATTORNEYS Aug. 1, 1961 J. T. ZELLERS, JR 2,994,519
GLASS MELTING FURNACE AND METHOD OF OPERATION
Filed March 27, 1959 3 Sheets-Sheet 3
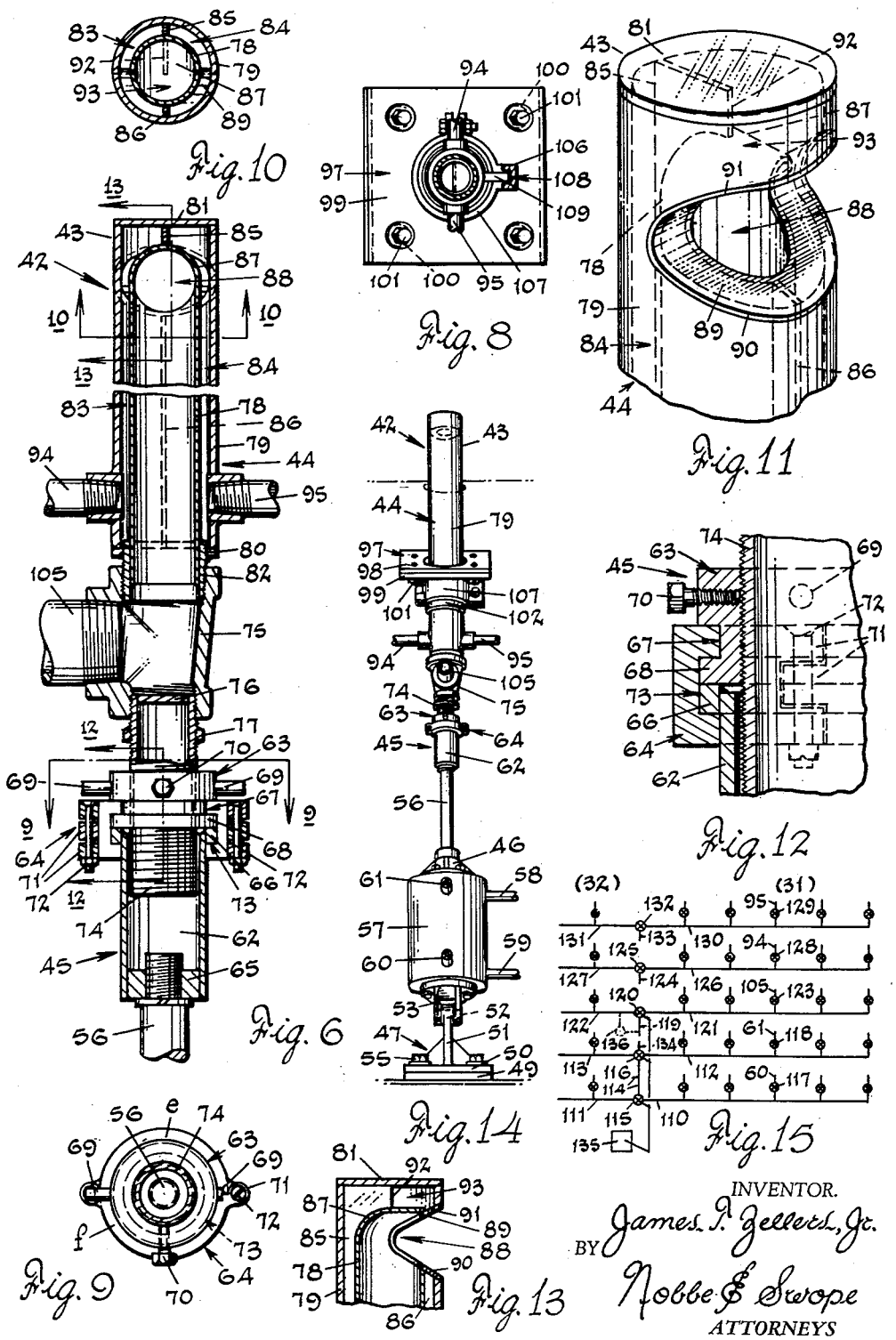
INVENTOR.
James T. Zellers, Jr.
BY Nobbe & Swope
ATTORNEYS United States Patent Office 2,994,519
Patented Aug. 1, 1961

2,994,519
GLASS MELTING FURNACE AND METHOD OF
OPERATION
James T. Zellers, Jr., Charleston, W. Va., assignor to
Libbey-Owens-Ford Glass Company, Toledo, Ohio, a
corporation of Ohio
Filed Mar. 27, 1959, Ser. No. 802,338
3 Claims. (Cl. 263—15)

The present invention relates broadly to the art of glass making and, more particularly, is concerned with an improved method and apparatus for producing the high-firing temperatures by which the glass batch materials are reduced to a molten mass.

In glass melting tank furnaces of the well known regenerator type, heated air is conducted to the melting area of the furnace through closed passageways terminating in ports arranged in the side walls thereof somewhat above the glass level, and combustible gases are injected into this heated air from nozzles extending through the side walls of the air passageways adjacent the ports. The flame formation emerging into the actual melting zone, however, has been known for many years to produce a firing pattern substantially in the form of a cross. That is to say, the nozzles for the combustible gases have heretofore been arranged in divergent planes, in the side walls of the air passageway, and this has caused these gases and heated air under high pressures to merge into a flame which, due to the said pressures, flares upwardly and downwardly as well as spreading laterally or substantially horizontally across the molten pool of glass. Now the vertically flaring portions of the flames have been found to cause, inter alia, the rapid deterioration of the blocks forming the roof arch and, simultaneously, an objectionable searing or burning of the molten glass surface. Accordingly, rapid erosion of the refractory blocks making up the roof arch produces an undesirable condition in that the arch surface falls away and these particles become unpredictable ingredients of the melting glass. This causes glass faults such as stone, seed and the like in the glass ribbon that is eventually formed at the flow spout or draw-chamber of the furnace. Likewise, and especially in the ports located in the vicinity of the supply or dog-house area of the tank furnace, the downwardly flaring portions of the flames actually burn the top surface of the batch materials after they have been fed into the dog-house and gradually enter the molten pool. Consequently, the beneficial action of the laterally spreading portions of the flames to melt, work and refine the molten glass therebeneath is more or less offset by the vertically rising and downwardly moving components of the flame pattern.

According to the present invention, the combustion gases, as will be hereinafter more fully described, are introduced into each of the air passageways through nozzles that are situated medially in the passageways and relatively close to the actual orifice of the related port in the furnace side wall. The gas from the nozzle therefore combines with and is carried into the current of heated air as a unitary gaseous stream with a consequential flame formation into a wide, substantially horizontal and continuous fan pattern, which is highly desirable in the glass melting process. The wall of each conducting gas pipe is contained within a jacket and a continuous flow of cooling fluid, such as water, is maintained therethrough to protect the burner pipe from the excessive heat to which it is subjected while located within the regenerator port.

The principal aim of the present invention, therefore, is to provide an improved method for reducing glass batch materials to a molten consistency and to increase the quality of the molten pool as it works its way toward the refining zone of the furnace.

Another object of the invention is to provide a method of the above character whereby the firing flames will spread above and across the surface of the molten glass pool with relatively less direct impingement on the said surface or upon the refractory structures of the tank-furnace.

Another object of the invention is to provide in methods of the above character means for substantially simultaneously removing the gas sources on one side of a furnace from the path of waste combustion gases carried over from the other side of the furnace during the alternately reversing cycles of a regenerator type of firing.

Another object is to provide an improved burner apparatus for accomplishing the advantages of the above described method.

Another object of the invention is to provide a burner apparatus adapted to be positioned in the medial area of heated air currents moving forwardly in a confined passageway connected to a regenerator chamber of the glass-melting tank-furnace.

Another object of the invention resides in the provision of a mounting for a burner apparatus of the above character adapted to position the burner head in and to remove the same from the actual area of operation during the alternating cycles carried out in regenerative types of glass-melting tank-furnaces.

Another further object is to provide a burner apparatus of the above character having retractable mounting means whereby the actual burner head of said apparatus is alternatively raised and lowered into and from a furnace port during the reversal of firing cycles to protect the same from the waste combustion gases of high temperatures entering said port.

A further object is to provide means for operatively interconnecting burner apparatus mountings of the above character and to move said burner apparatus associated with the ports on one side of a furnace into active firing position while simultaneously removing such burner apparatus in ports on another side of said furnace to an inactive position.

A further object of the invention is to provide burner apparatus of the above-described characteristics which is efficiently constructed, durable over prolonged periods of operation and mountable in associated furnace structures for rapid and easy adjustment and maintenance.

Other objects and advantages of the invention will become more apparent during the course of the following description, when read in connection with the accompanying drawings.

In the drawings, wherein like numerals are employed to designate like parts throughout the same:

FIG. 3 is a fragmentary elevational view of a furnace burner port with a burner apparatus in operative position;

FIG. 4 is an enlarged view of the burner apparatus constructed in accordance with this invention and as disclosed in FIG. 2, with the burner head in an operative position;

FIG. 5 is a horizontal sectional view as taken on line 5—5 of FIG. 4;

FIG. 6 is a vertical sectional view as taken on line 6—6 of FIG. 4;

FIG. 7 is an enlarged detail view of the upper end of the burner;

FIG. 8 is a horizontal sectional view as taken on line 8—8 of FIG. 4;

FIG. 9 is a horizontal sectional view as taken on line 9—9 of FIG. 6;

FIG. 10 is a horizontal sectional view as taken on line 10—10 of FIG. 6;

FIG. 11 is a fragmentary perspective view of the upper end of the burner;

FIG. 12 is an enlarged sectional view as taken on line 12—12 of FIG. 6;

FIG. 13 is a vertical sectional view as taken on line 13—13 of FIG. 6;

FIG. 14 is a side elevation view of the burner; and

FIG. 15 is a diagrammatic view of a control system for supplying and operating the several burners of a furnace.

Figure 1:
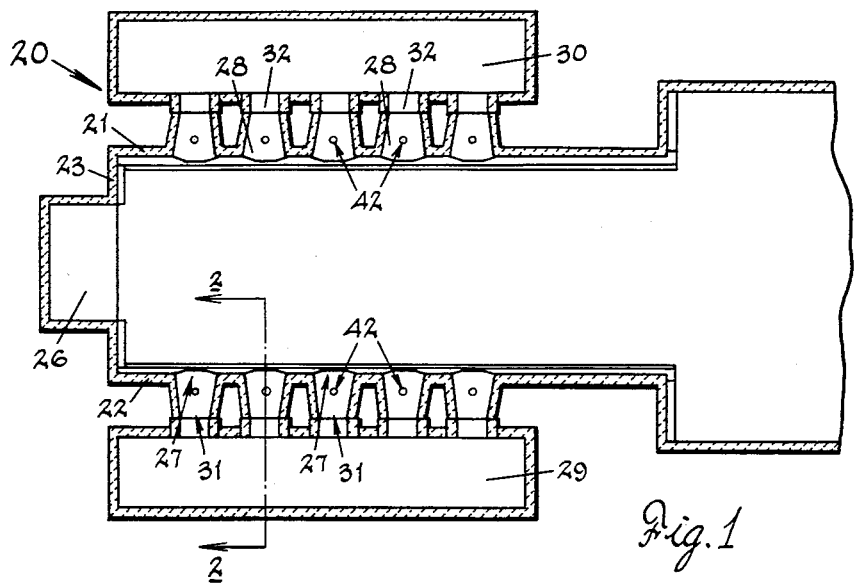
FIG. 1 is a plan view of a glass-melting tank-furnace of the regenerator type.

Referring now more particularly to FIG. 1 of the drawings, there is shown a glass-melting tank-furnace, generally designated by the numeral 20 which includes side and end breast walls 21, 22 and 23 respectively, a bottom wall 24 (FIG. 2), a roof arch 25 and a conventional glass batch feeding or dog-house area 26. While not herein delineated or especially described, it will be understood that the various walls 21, 22, 23 and 24, and arch 25, are inter-related and supported by structural members as is well known in the art. As well, each of the side walls 21 and 22 is provided with regularly spaced ports 27 and 28, respectively, which are in communication with associated regenerator chambers 29 and 30 by means of passageways 31 and 32. As more clearly shown in FIGS. 2 and 4, each passageway 31 and 32 is defined by side walls 33 and 34, a roof 35 and floor 36. The inwardly positioned ends of these structural elements are sealingly connected to like side walls 37 and 38, roof 39 and floor blocks 40, of each of the several ports 27 or 28 as the case may be.

In the well known operation of regenerator-type melting furnaces and during one cycle, firing of the furnace is carried out by burner devices associated, as with the passageways 31 communicating with the ports 27, and the products of their combustion are exhausted through the directly opposed ports 28 and passageways 32 to pass downwardly into the related regenerator 30. In so doing, the hot residual gases of combustion move over downwardly and about the structure 41 of checkerbrick, conventionally arranged therein, to highly heat the same. Each regenerator is connected in the well known manner to a chimney (not shown) and the movement of the products of combustion normally move toward and through the so-described passageways and regenerators under the positive influence of the so-called "stack" effect. During an alternate cycle of firing, burners arranged in the ports 28 are operated and the resulting waste gases are exhausted through the several ports 27 and passageways 31 to the associated regenerator 29.

According to this invention, the supplying of a combustible gas during a firing cycle is accomplished by means of a retractably mounted burner apparatus, generally designated by the numeral 42 throughout the drawings. Generally stated, this apparatus includes a burner head 43, a jacketed manifold 44 therefor, an adjustable support 45 and an operating cylinder 46. Thus, the cylinder 46 is pivotally carried on a bracket 47 that is adjustably mounted on a channel 48 of the furnace structure by means of a fixed plate 49. More particularly, as shown in FIGS. 4 and 5, the bracket 47 comprises a base plate 50 that is equipped with a vertically disposed ear 51 adapted to carry a pin 52 passed through the support lugs 53 of the cylinder 46. The plate 50 is also provided with suitably disposed slots 54 which receive bolts 55 threaded into the fixed plate 49. This will enable ready adjustment of the burner 42 bodily at its lowermost end when the same is installed and for purposes to be hereinafter more clearly disclosed.

Figure 2:
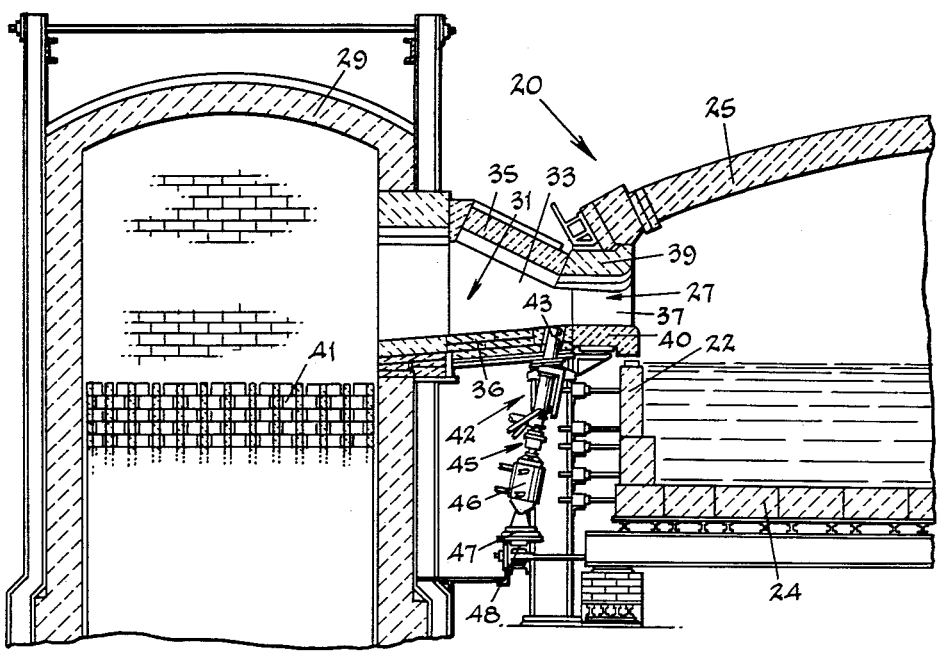
FIG. 2 is a transverse vertical section through a burner port in the tank-furnace on line 2—2 of FIG. 1, showing the burner in an inoperative position.

It is herein proposed that the burner 42 be mounted for reciprocal movements to locate the head 43 thereof in an inoperative position, as shown in FIG. 2 during one firing cycle and then in a raised operating position during an alternate cycle as shown in FIG. 4. This enables the burners 42 associated with the ports in one side of the tank-furnace to carry out their purpose and then during an inactive cycle to be lowered beneath the surface of the floor 36 of the passageway 31 thereby being protected from the highly heated exhaust gases entering the ports and carried into the regenerator associated therewith.

For this purpose, the rod 56 of the piston 56' of each cylinder 46 is attached at its outer end to the adjustable support 45. The cylinder 46 is enclosed by a tubular cooling jacket 57, which is supplied continuously with a coolant liquid, such as water, by pipes 58 and 59 and which insulates the cylinder per se from the relatively hot ambient air in which the burner is positioned. Pipes 60 and 61, passing through the walls of the jacket 57, connect the cylinder 46 to a control system whereby the burner head 43 will be sequentially raised and lowered. Preferably the burners associated with the passageways 31 are connected in common, as shown generally in FIG. 15, to one side of a control valve while those burners associated with the passageways 32 are connected in a like manner to the valve to the end that each series of burners will be simultaneously raised or lowered during the reversals of firing. Likewise, for purposes of repair or adjustment, the movements of each burner can be individually controlled by suitable valves.

The end of piston rod 56 is threaded into an end of the adjustable coupling 45. This coupling is comprised of a tubular cup 62, a hand-nut 63 and collar 64. Cup 62 is adapted to receive the threaded end of rod 56 in the end wall 65 thereof and is provided at its opposite open end with an integral annular flange 66. The hand-nut 63 is substantially cylindrical and the outer surface thereof is medially provided with an annular groove 67. One end of nut 63 therefore constitutes a hub or flange 68 which abuts the flanged end 66 of cup 62 while the opposite end thereof is provided with manually engageable pins or spokes 69 and a set-screw 70. Collar 64, as best shown in FIGS. 9 and 12, may be formed of semi-circular component parts e and f having alternately arranged lugs 71 interfitting at the mating end surfaces and adapted to receive bolts 72 to secure the component parts of the collar together. In an integral sense, the collar 64 has an internal groove 73 for receiving the associated flanges 66 and 68 whereby rotation of the hand-nut 63 can be easily obtained but will not separate it from the cup member 62. The hand-nut 63 is internally threaded to receive an externally threaded shank or tubular connection 74 which at its opposite end is more or less fixedly secured in one end of a pipe T 75. As herein shown, the shank 74 may be provided in the form of a pipe having a closed end 76 and equipped with a plain or hexagon surfaced ring portion 77 to enable assembly of the pipe into the pipe T 75 without ensuing damage to the threads thereon. Accordingly, upon release of the set-screw 70, the hand-nut 63 can be rotated within the collar 64 which will propel the connection 74 outwardly from or retract the same inwardly with respect to the cup member 62 and this will increase or lessen the distance between the adjustable support 45 and the T 75.

The pipe T 75 constitutes one end element of the manifold 44 while the especially constructed burner head 43 defines the other end. More particularly, a preferred embodiment of the manifold may be produced in the form of a weldment which includes a centrally disposed gas conduit or pipe 78, an axial sleeve or annular outer wall 79 and end closure plates 80 and 81. The end plate 80 is actually provided in the form of a ring to fixedly receive a short pipe nipple 82 therein. In turn, the pipe nipple 82 receives an end of pipe 78 in fixed relation. Pipe nipple 82 at its externally threaded end is located in the T 75 in substantially axially aligned relation with the previously described shank 74.

As viewed in FIGS. 6, 10 and 11, the space between the concentrically arranged pipe 78 and sleeve 79 provides an annular chamber for circulating a coolant, such as water, and for this purpose is divided into compartments 83 and 84, by means of partitions 85 and 86, which are sealed at one end to and in the vicinity of the adjoining pipe 82 and end plate 80. On the other hand, as shown in FIGS. 11 and 13, the pipe 78, at its outer end adjacent the end closure plate 81, is closed by suitably shaping of its wall surface 87 and except for a laterally directed orifice 88 that is defined in the cylindrical wall of pipe 78 substantially as a circular opening. The axial line of the opening defining the orifice 88 is normal to the longitudinal axis of pipe 78 and in coaxial relation, an opening is formed in the wall or sleeve 79 that is somewhat elliptical in outline. A substantially V-shaped closure plate 89 is secured, as by welding, to the edge of the orifice 88 and is likewise secured to the aligned opening in sleeve 79. This creates the supply port or nozzle of the burner head 43 having outwardly flaring wall surfaces 90 and 91.

The above-described partition 85 is secured to the end closure plate 81 and follows the contour of the wall surface 87 of pipe 78 to a vertically disposed edge 92 located substantially in line with the axis of pipe 78 (FIG. 13). This will create a communicating passageway or opening 93 between compartments 83 and 84. On the other hand, the partition 86 is secured at its proximate end to the inner surface of the wall 90. The outer wall 79 is equipped at its opposite end with supply and drain pipes 94 and 95 whereby a coolant fluid can be circulated from pipe 94 through compartment 83 to opening 93 and thence by compartment 84 to the pipe 95.

In the operative position of the burner 42, the manifold 44 thereof is disposed in and movable through an opening or passageway 96 formed in the floor 36 of the passageway 31 with which it is associated. As indicated in the several figures, the burner bodily is located in an angular plane to the vertical in order that the gases ejected from the burner head 43 will be initially directed along the plane of a line slightly inclined downwardly from the horizontal. In order to support the burner for movement along this angular plane, a mounting member or plate 97 is provided and is adjustably attached to a plate 98 fixed to the structure of the furnace. The mounting plate has a base 99, provided with bolt openings 100 that are larger than the bolts 101 situated therein, and an integral tubular gland portion 102. The tubular portion is formed angularly with reference to the base 99 so that the axis thereof is located substantially coincident with the axis of the burner. At the outer end of this tubular portion or collar 102, a bearing sleeve 103 is mounted to more or less loosely surround the surface of the outer wall or sleeve 79 of the manifold 44.

Now, in the installation of a burner 42, the head 43 thereof is passed through the bearing sleeve 103 and projected upwardly into port area above the floor 36. Upon mounting the cylinder 46 by means of pin 52 on the bracket 47, the desired adjustments may be accomplished by loosening of the bolts 101 and shifting the mounting plate 97 until the manifold 44 is substantially centrally aligned with reference to the opening 96. This may require loosening of the bolts 55 to allow adjusted shifting of the bracket 47 to bring the longitudinal axis of the burner 42 into the desired angular plane as well as in substantially concentric relation with the said opening. Since the length of work stroke of the cylinder 46 is easily predetermined, the optimum height or elevation of the burner head 43 above the port floor 40 is governed by the positional relation of the manifold 44 to the adjusting member 45.

Upon loosening of the set-screw 70, the hand-nut 63 may be turned on the threads of the shank 74. However, since said nut is restricted in movement by the hub 68 thereof as engaged by collar 64, the actual motion incurred will be reflected in the inward or outward movement of the shank 74 relative to the cup member 62. When a desired positioning of the burner has been attained, conventional supply and drain conduits are connected to the pipes 58, 59, 94 and 95, the control system conduits are attached at the pipes 60 and 61 for cylinder 46 and in the same manner, a flexible conduit of the general piping for supplying the combustible gases is connected at pipe 105 to the pipe T 75. Since this pipe joint is in open communication with pipe 78, the burner head 43 will be adapted for active firing when desired.

During raising and lowering of the burner apparatus 42, means is provided to insure that it does not rotate, which action would carry the orifice of the head 43 out of alignment with the longitudinal axis of its associated passageway. For this purpose, a channeled bar 106 as shown in FIGS. 4 and 8, is fixedly carried on the mounting member 97 by a clamping collar 107. The bar 106 is adapted to depend therefrom in parallel with the longitudinal axis of the burner 42 and, in the channel 108 thereof, receive a lug 109 fixedly attached to the outer surface of the pipe 79.

The burners 42 accordingly are mounted for movement into and out of operative position such as indicated in FIGS. 2 and 4 and, in their centrally disposed location in each of the several ports 27 and 28 and passageways 31 and 32, are adapted to be simultaneously raised or lowered whereby the burners associated with ports 27 will be located or raised into firing position and all of the burners associated with the ports 28 will be lowered to their respective positions. Likewise, during the sequentially occurring alternation of firing cycles, the entire number of burners in passageways 31 will be lowered while those burners in the passageways 32 will be raised to carry on the melting operation. For this purpose, the pipes 60 of the burners 42 on one side of the furnace 20 are connected to a distributor pipe 110, while the pipes 60 on the other side of the furnace are connected to a pipe 111. Similarly, each of the several pipes 61 are connected to supply or distributor pipes 112 and 113. The pipes 110 and 111 are connected to a pressure supply pipe 114 through a conventional four-way valve 115 while in the same manner pipes 112 and 113 are connected to pipe 114 by a valve 116. Preferably each of the pipes 60 and 61 are equipped with a control valve 117 or 118 respectively so that opening or closing of the service pressure lines can be obtained for each cylinder 46. Likewise, the connection of a gas supply can be made to each of the burners 42 at the pipes 105 and pipe T's 75 by means of a service pipe 119 through a main control valve 120 and distributor pipe 121 connecting to the burners on one side of the furnace and pipe 122 to the burners on the opposite side of the furnace. To individually control the supply of combustible gas to any of the burners, a valve 123 is interposed in each of the lines between either of the pipes 121 and 122 and the related pipes 105.

The coolant supply to the manifolds 44 in a similar manner, can be maintained from a source pipe 124 through a valve 125 to distributor pipes 126 and 127 to the several pipes 94 attached to the outer wall or pipe 79. Also each pipe 94 may be equipped with an individual valve 128. The pipe 95 of each manifold, on the other hand, is equipped with a valve 129 through which they can be selectively connected to distributor pipes 130 and 131 and through main valve 132 to a service pipe 133.

During the firing cycles, the several valves 128 and 129 will be opened to supply coolant, such as water, from the supply pipes 126, 127, 130 and 131 to the pipes 94 and 95 of the manifolds 44. Of course, the pipes 126 and 127 may carry the fresh coolant while the pipes 130 and 131 will carry off the draining coolant through the respective valves 125 and 132 to the sources 124 and 133.

Now, the burners 42, associated with the ports 27 as illustrated in FIG. 4, will be supported in their raised position by pressure supplied from pipe 114 through valve 115 and by way of distributor pipe 110 and valves 117 to the pipes 60 of the cylinders 46. At the same time, the burners 42 associated with the furnace ports 28 will have been lowered to their inoperative positions by connection of distributor pipe 114 with pipe 113 through main valve 116 to a drain line 134. The firing from the ports 27 and by means of the burners 42 situated therein, will likewise be carried out by reversal of valve 120 to close pipe 122 and connect supply and distributor pipes 119 and 121 to the several pipes 105.

In carrying out the method of this invention, it is entirely possible that the main valves 115, 116 and 120 will be controllably monitored by an automatic time control system, indicated diagrammatically at 135, to the end that in accordance with the conventional modus operandi of a regeneratively fired tank-furnace, the alternate reversals of the firing can be placed upon predetermined time schedules. For example, on a time interval adjustment as of thirty minutes, the main valves 115, 116 and 120 can be automatically controlled to open and close the gas service supply simultaneously or in following order with the alternate raising and lowering of the burner apparatus 42.

It is further entirely conceivable that a preferred mode of operation might utilize individual main valves for the supply of gas to the distributor pipes 121 and 122—that is to say—service pipe 119 can be individually connected through a main valve 136 (indicated in broken line) to distributor pipe 122 while service from pipe 119 will be individually connected to pipe 121 through main valve 120. Operating in this manner, the automatic control would be adapted, by way of example, to close the gas supply via main valve 120 to distributor pipe 121 and the burners 42 associated with the ports 27 before the reversal of valves 115 and 116 to produce lowering of these burners while elevating the burners located in the ports 28. In timed relation to raising of the burners to reverse the direction of firing in the furnace, the main valve 136 would open service to pipe 122. Thus, in alternating sequences of firing, the gas supply to the burners on one side of the furnace would be closed before they are lowered while gas supply to the burners on the opposite side of the furnace would be opened after they have been simultaneously raised into operative position.

The improved burner apparatus herein provided has thus been so designed as to greatly facilitate the alternate firing of a glass-melting tank-furnace. Moreover, since the burner apparatus 42 in its lower or inoperative position, locates the head 43 thereof beneath the floor 36 of the furnace passageways, the orifice or nozzle 88 of the inactive burner apparatus, as in passageway 31, is substantially concealed or protected from the high heat of the flames issuing from the opposite port 28 and passageway 32, and the exhaust waste gases which enter the port 27 and pass downwardly through the passageway 31 to the associated regenerator 29. This not only tends to reduce, if not eliminate, rapid deterioration or "burning-out" of the burner structure due to constant subjection to the high temperatures but the intervals of time between inspection and cleaning will be considerably extended. That is to say, the orifice 88 and the surfaces thereabout will not receive gradual accumulations of dust, dirt and the products of combustion carried over by the exhausting gases. This would reduce the efficiency of the burner when in operation and as well tend to interfere with the frequently occurring movement thereof. In addition, the burner apparatus is adapted to easy adjustment and to be maintained in service without lengthy periods of lost time while they are being repaired.

Accordingly, the burner apparatus, as shown in FIGS. 4 and 14, is provided with novel means for predeterminedly setting the angle at which the issuing flames will be directed over the molten glass. This may be quite important in the event that it is desired the burners associated with the ports more closely located with respect to the dog-house be located at an angle more normal to the perpendicular than those located closer to the refining end of the furnace. This will enable the high temperatures of the flames to be directed over the batch materials, rather than downwardly thereupon, to prevent actual burning of the relatively dry ingredients until they have become softened so as to merge into the molten pool of glass. The variation of angle may be quite slight but the desired angular position can be obtained by loosening of the bolts 55 so that the bracket 47 can be adjustably shifted with reference to the fixed plate 49. This will cause a small amount of pivotal movement of the manifold 44 within the collar 102 of the mounting member 97 and consequent motion of the manifold within the passageway 96.

Likewise alignment of the burner head 43 with reference to the axis of the furnace passageway and associated port can be effected by loosening of the clamping collar 107 to rotate the burner bodily about its longitudinal axis without removal of the lug 109 from the channel 108. During normal operations, the fixed position of the collar 107 insures that the burner will not rotate since in being moved upwardly or downwardly, the lug 109, fixed to the outer surface of pipe 79, will traverse the channel 108 of bar 106. And, while the stroke of piston rod 56 may be predetermined to control the distance the burner head 43 travels, the actual elevation thereof above the floor 36 of the passageway is determined by the adjustable support 45. Thus, upon loosening of the set-screw 70, the hand-nut 63 can be employed to raise or lower the manifold 44 with respect to the cup member 62 as the threaded connection 74 is moved in or out.

When necessitated adjustments become necessary, one burner apparatus can be restrained from rising by operation of the individual valve 117 associated with the pipe 60 to the cylinder 46 thereof. Likewise, complete removal of the burner apparatus can be accomplished upon closure of the associated valves 117, 118, 123, 128 and 129 after which removal of the pin 52 will disconnect the cylinder 46 from the mounting bracket 47. And, while detailed reference has not herein been made to the connection of pipes 58 and 59 supplying coolant to the jacket surrounding the cylinder 46, it will be appreciated that service lines, similar to those above-described in connection with distributor pipes 126 and 130, can be adequately supplied.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In a tank type glass melting furnace wherein said furnace includes side walls, an end wall, a top wall and a bottom wall defining a channel in which batch materials, when the furnace is fired, are melted to form a stream of molten glass that flows through said furnace, said furnace including regenerator chambers one on each side of the glass channel, a plurality of regularly spaced burner ports located in each side wall of the furnace, the burner ports in one side wall being directly opposite to the burner ports in the opposite side wall the improvement comprising passageways connecting each of said burner ports with one of the regenerative chambers, a plurality of vertically retractable burner heads, one of said burner heads being selectively insertable into each passageway, each burner head including an orifice through which combustion gases are directed to fire said furnace, means connecting the burner head with a source of combustible gas, said burner head including means for positioning the longitudinal axis of the burner head into angular relationship with the longitudinal axis of said passageway and simultaneously placing said burner orifice in concentric relationship with the firing port associated with said passageway and means for moving each burner head into operative position within said passageway and for withdrawing it therefrom to an inoperative position, said last-mentioned means including means connecting the burners at opposite sides of the furnace for moving all of the burners at one side of the furnace as a unit into operative position within the passageways and for simultaneously withdrawing all of the burners at the opposite side of the furnace as a unit from the passageways to an inoperative position whereby when all of the burners on one side of the furnace are in the operative position all of the burners on the opposite side of the furnace are in the inoperative position, said burner positioning means including adjustable means for varying the distance the burner head moves into the said passageway, said burner positioning means including a base, a hydraulic cylinder pivotably connected to said base, a piston rod mounted in said cylinder and means connecting the burner head to said piston rod, said burner head connecting means including said adjustable means to vary the distance the burner head moves into the said passageway, said adjustable means including a coupling member fixedly secured at one end to said piston rod and having a flanged rim at its opposite end, an externally threaded member fixedly secured to the adjoining end of the burner head and adapted to be received in the coupling member, a rotatable nut threadably mounted on said threaded member, and means clampingly securing the nut to the flanged rim of said coupling member to mount the burner head in adjustably fixed relation to said piston rod.

2. In a tank type glass melting furnace wherein said furnace includes side walls, an end wall, a top wall and a bottom wall defining a channel in which batch materials, when the furnace is fired, are melted to form a stream of molten glass that flows through said furnace, said furnace including regenerator chamber on each side of the glass channel, a plurality of regularly spaced burner ports located in each side wall of the furnace, the burner ports in one side wall being directly opposite to the burner ports in the opposite side wall the improvement comprising passageways connecting each of said burner ports with one of the regenerative chambers, a plurality of vertically retractable burner heads, one of said burner heads being selectively insertable into each passageway, each burner head including an orifice through which combustion gases are directed to fire said furnace, means connecting the burner head with a source of combustible gas, said burner head including means for positioning the longitudinal axis of the burner head into angular relationship with the longitudinal axis of said passageway and simultaneously placing said burner orifice in concentric relationship with the firing port associated with said passageway and means for moving each burner head into operative position within said passageway and for withdrawing it therefrom to an inoperative position, said last-mentioned means including means connecting the burners at opposite sides of the furnace for moving all of the burners at one side of the furnace as a unit into operative position within the passageways and for simultaneously withdrawing all of the burners at the opposite side of the furnace as a unit from the passageways to an inoperative position whereby when all of the burners on one side of the furnace are in the operative position all of the burners on the opposite side of the furnace are in the inoperative position, said burner positioning means including means for varying the distance the burner head moves into the said passageway, said burner head being formed by an external cylindrical wall closed at its opposite ends and an axially concentric pipe contained within the cylindrical wall, said cylindrical wall and pipe forming an annular closed chamber therebetween, said burner orifice opening laterally through said pipe adjacent the upper end thereof, means for supplying coolant to said chamber, said means connecting said burner head with a source of combustible gas including means for supplying the combustible gas directly to said pipe.

3. In a tank type melting furnace as defined in claim 2, wherein each passageway includes a bottom wall having an opening situated medially thereof through which said burner head moves, mounting means aligned with said opening to guide said burner head into alignment with said opening, said burner positioning means including cooperating interlocked members, one member carried by said mounting means and one member carried by said burner head said interlocked members preventing axial rotation of said burner head during movement thereof into and away from operative position through said passageway opening.

References Cited in the file of this patent
UNITED STATES PATENTS

| | | |
|---|---|---|
| 1,232,756 | Best | July 10, 1917 |
| 1,941,411 | Mulholland | Dec. 26, 1933 |
| 2,016,945 | Paxton et al. | Oct. 8, 1935 |
| 2,114,744 | McBurney | Apr. 19, 1938 |
| 2,542,684 | Laverdisse et al. | Feb. 20, 1951 |

FOREIGN PATENTS

| | | |
|---|---|---|
| 424,956 | Germany | Feb. 10, 1926 |
| 450,531 | Great Britain | July 20, 1936 |